Nov. 30, 1926.
H. L. DE ZENG
1,608,726
DIAGNOSTIC INSTRUMENT
Filed July 19, 1922   2 Sheets-Sheet 1
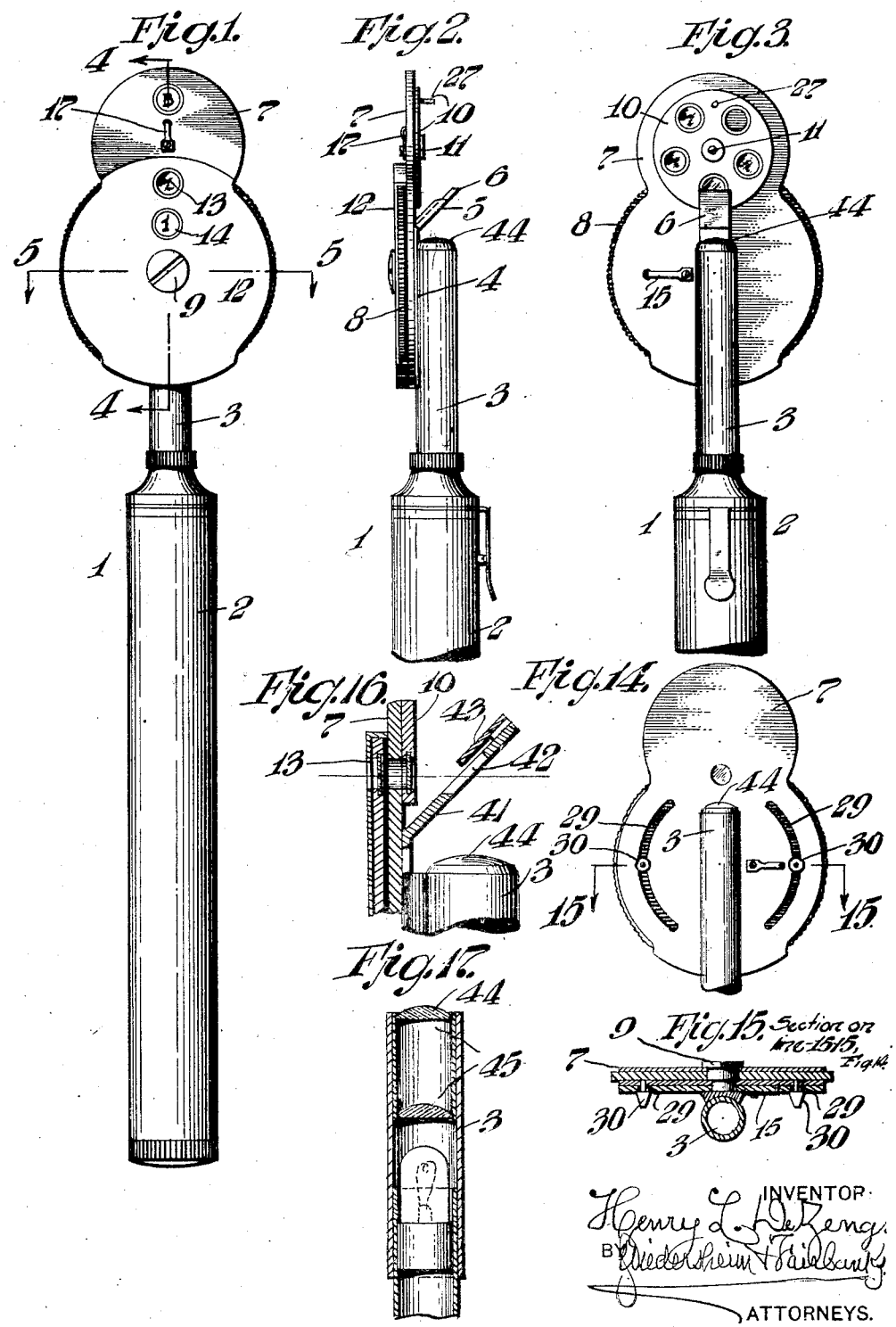

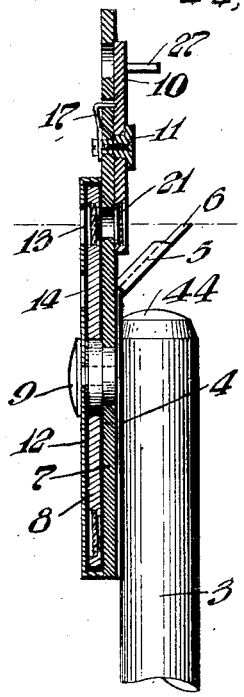

Patented Nov. 30, 1926.

1,608,726

UNITED STATES PATENT OFFICE.

HENRY L. DE ZENG, OF MOORESTOWN, NEW JERSEY, ASSIGNOR TO DE ZENG STANDARD COMPANY, OF CAMDEN, NEW JERSEY, A CORPORATION OF NEW JERSEY.

DIAGNOSTIC INSTRUMENT.

Application filed July 19, 1922. Serial No. 576,129.

My invention relates to a new and improved form of diagnostic instrument for the eye, ear, nose, etc., wherein I employ one or more series of lenses situated on the observer's side of a central body plate having a sight opening, the lenses in the series being adjustably mounted and adapted to register with the sight opening. On the opposite side of the body plate, I mount adjustably auxiliary lenses which are also adapted to function with the sight hole and which are carried in a rotatable disc or other movable member which latter would be mounted beneath the reflector.

By the employment of this construction, I am enabled to produce a diagnostic instrument of comparatively small size yet having a very wide range of lens foci, with a minimum separation between the eye of the observer and the face of the reflector, as is evident by referring to the drawings. It will be seen that any of the auxiliary lenses may be placed in optical alignment with the sight opening in the body plate without passing beneath the lower edge of the reflector and that their adaptation to, or use with the instrument, in no wise prevents the closest positioning of the reflector to the main body plate and the sight opening therein.

This construction, embodying one of the features of my invention, enables me to make a diagnostic instrument having but one limited lens carrier on the operator's side and one of smaller capacity on the other side of the main plate, with all of the lens foci required in an instrument of this kind, thereby producing a very thin and compact instrument with the reflector positioned extremely close to the body plate and to the sight opening therein, and in consequence an instrument which offers an unusually wide angle of observation.

Another feature of my invention consists in a suitable opening in the central body plate through which lens indicators on the auxiliary lens carrier may be seen from the operator's side of the instrument.

A further object is to place lenses in the auxiliary lens carrier having the property of selectively retarding certain light rays.

A further object is to provide a single main disc or lens carrier having both plus and minus lenses of certain foci and sequence, and an auxiliary lens carrier on the opposite side of the main body plate, likewise having lenses of certain foci and arranged in particular sequence.

A further object is to devise an improved form of mounting for the reflector whereby the auxiliary lenses may pass across the sight opening in the body plate without affecting the closest proximity of the reflector thereto.

A further object is to devise a reflector impervious to light and so stationed with respect to the sight opening in the central body plate that the object may be seen by looking past the periphery of the reflector.

A further object is to devise a novel mechanical arrangement for supporting the light passageway and the reflector upon the body portion of the instrument, a continuous piece of metal acting as holding means for both.

Another novel feature of my invention is the adjustment of the light source with respect to the reflector whereby I am enabled to direct light rays of varying divergence or convergence through the speculum and in this manner to increase or decrease the amount of illumination of the object, when viewed through the speculum.

A further object of my invention is to devise a diagnostic instrument having a main body plate with sight opening, one or more series lenses adjustably mounted and adapted to register with the sight opening and a speculum adapted to function with said sight opening so that the eye, ear or nose may be examined with it. The speculum is preferably detachably connected with the other parts of the instrument.

When the speculum is attached, for an examination of the ear or nose, I am enabled to examine any object which may be located at the end of the speculum or any distance beyond by reason of the adjustable lens series which give the instrument any desired focal range, whereas in all other ear or nose examining instruments only objects lying within the fixed focal range of the magnifying lens can be examined.

In using detachable specula of different sizes and shapes, my invention provides a single diagnostic instrument with which an examination of the eye, ear or nose may be made in contrast with the present employment of two or three separate and complete instruments for accomplishing the same purpose.

My invention provides an instrument of extreme portability and simplicity, while at the same time covering a very wide range of usefulness, the one instrument combining an ophthalmoscope, an otoscope and a nasal scope.

With the above and other objects in view, all as will hereinafter appear, my invention comprehends a novel diagnostic instrument.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a front elevation of a diagnostic instrument, embodying my invention.

Figure 2 represents a side elevation thereof.

Figure 3 represents a rear elevation thereof.

Figure 4 represents a section on line 4—4 of Figure 1.

Figure 5 represents a section on line 5—5 of Figure 1.

Figure 6 represents a plan view of the main lens carrier in detached position.

Figure 7 represents a plan view of the auxiliary lens carrier in detached position.

Figure 8 represents, in side elevation, a diagnostic instrument, embodying my invention, in conjunction with which a detachable speculum is employed.

Figure 9 represents a face view of Figure 8.

Figure 10 represents, in side elevation, another embodiment of my invention in which the speculum forms a permanent part of the instrument and is movable into operative and inoperative position.

Figure 11 represents a rear view of the construction seen in Figure 10.

Figure 12 represents a section on line 12—12 of Figure 10.

Figure 13 represents, in front elevation, another embodiment of my invention.

Figure 14 represents, in rear elevation, another embodiment of my invention.

Figure 15 represents a section on line 15—15 of Figure 14. Figure 16 represents a fragmentary section of an embodiment of my invention using a different type of reflector. Figure 17 represents a sectional view of another embodiment of my invention using a multiple condenser system.

Similar numerals of reference indicate corresponding parts.

Referring to the drawings.

1 designates a diagnostic instrument, embodying my invention. The instrument is provided with a grasping handle 2 which serves as a container for source of electric supply such as a storage battery, not shown, which controls in the usual manner the lamp, not shown, which is contained within the light tube 3. Instead of a storage battery the lamp can be connected with the usual lighting system. The light tube 3 has connected with it the reflector support 4 which is in the form of an angle, the lower portion of which is connected to the light tube 3, while its upper portion 5 carries a reflector 6.

7 designates the body portion of the diagnostic instrument, which is fixed in any desired manner with respect to the light tube 3, the reflector support 4 being preferably interposed between the body portion 7 and the light tube 3. The body portion 7 is illustrated in the form of a plate which carries a main lens carrier 8 which is pivotally supported on a fastening device 9, and above the main lens carrier 8 is carried an auxiliary lens carrier 10, which is in the form of a disc pivotally supported at 11.

12 designates a cover plate which is retained in assembled position by means of the fastening device 9. The cover plate 12 is provided with a sight opening 13 and in proximity to this sight opening is a reading aperture 14, which, if desired, may be a continuation of the sight opening 13. The body portion 7 has secured to it one end of a stop spring 15, which extends through the cover plate to engage a recess 16, in the lens carrier 8, in order to retain it in the position to which it has been adjusted and insure alignment with the sight opening.

In a similar manner, the auxiliary lens carrier 10 is retained in proper alignment by means of a stop spring 17, see Figure 4, which is carried by the body portion 7. The main lens carrier 8, see Figure 6, is provided with a series of lenses of different powers or strengths.

As illustrated, the lens carrier 8 is provided with fifteen lenses 18, circumferentially disposed, and an aperture 19. The face of the lens carrier 8 is provided with the index numbers 20 corresponding to the power or strength of the different lenses, and these index numbers are visible through the reading aperture 14 when the lens of the corresponding power or strength is in alignment with the sight opening 13. In a preferred form of my invention, the lenses included in the lens carrier comprise plus 1, 2, 3, 4, 5, 6 and 7 and minus 1, 2, 3, 4, 5, 6, 7 and 8 diopters, the plus numbers being customarily shown in white figures, the minus in red. The body portion 7 is provided with a sight opening 21 in alignment with the sight opening 13. The auxiliary lens carrier 10 is provided with lenses of different character which are adapted to be brought into alignment with the sight openings 21 and 13.

Referring now more particularly to Figure 7, the auxiliary lens carrier 10, as illustrated, is in the form of a disc having mounted in it a plus 16 diopter lens 22, a minus 16 diopter lens 23, a red-free color filter 24 and a day light color filter 25. The auxiliary lens carrier 10 is also provided with an aperture 26. The auxiliary lens carrier 10 is provided with a grasping portion 27 of any desired construction, and, as illustrated, it is in the form of a pin.

In the embodiment seen in Figure 13, the auxiliary lens carrier 10 has a modified arrangement of the lenses, and a modified actuating member, which can be actuated from the operator's side of the diagnostic instrument, otherwise the construction is the same as that already described.

In the embodiment seen in Figure 13, the same lenses as seen in Figure 7 are carried by the auxiliary lens carrier 10 but they are arranged only part way around the circumference and the pin 27 extends through a slot 28 in the body portion 7.

In Figure 14, I have shown another embodiment of my invention in which the construction is similar to that already described, except that the body portion 7 is provided with the curved slots 29 through which extend the pins 30 which are carried by the auxiliary lens carrier 10, which in this embodiment, is mounted on the fastening device 9 so that the two lens carriers have a concentric movement.

It will be apparent that, in this embodiment, the two lens carriers are mounted on the same side of the body portion instead of on opposite sides, as shown in Figures 1 to 8 inclusive.

It will be apparent that in this embodiment, seen in Figures 14 and 15, the auxiliary lens carrier 10 can be actuated by means extending through the body portion.

Referring now to the embodiment seen in Figures 8 and 9, I employ in conjunction with the constructions already described, a detachable speculum 31. This speculum is carried on a bracket 32 having portions adapted to extend into the bracket support 33.

Referring now to the embodiment seen in Figures 10, 11 and 12, I employ a speculum, which is formed of the sections 34 and 35. Each section is loosely mounted on its respective shaft 36 carried by the body portion 7. The shafts 36 are carried by shaft supports 37, which in turn are carried by the body portion 7.

Each speculum is provided with a cam face 38 against which bears a pin 39 fixed to its shaft 36, a spring 40 being interposed between a shaft support 37 and each section, in order to retain the cam face 38 in operative engagement with its pin 39. In this manner, the speculum forms a permanent part of the diagnostic instrument, and, at the same time, it can be moved into its inoperative position so that it will not interfere with the ordinary use of the diagnostic instrument.

Any type of reflector, such as 6, may be employed, for example, in Figure 16, I have shown the reflector 41 provided with an aperture 42. A plate or shield 43 supported in any desired manner, overhangs the upper portion of the aperture 42 in order to prevent reflection of light from the upper edge of the reflector aperture into the eye of the operator.

It will be understood that the lamp may or may not be adjustable with respect to the condensing lens 44, see Figs. 2, 3 and 4, and in Fig. 17, I show a multiple condenser system which may be employed either with or without the adjustable lamp feature, the preferred form having two lenses 44 and 45, as shown. This latter form enables me to increase the illumination by reason of the wider light grasping angle than would be possible to employ with a single condenser system.

The multiple condenser system also enables me to bring the anterior focal point of the illuminating rays very close to the reflector without appreciable loss of light. This is a distinct advantage as it materially reduces corneal reflexes when working at the near point.

The operation and manner of use of the diagnostic instrument will now be readily apparent to those skilled in this art, and is as follows:—

The operator holds the instrument by means of the handle 2, so that the light from the lamp, not shown, will be reflected from the reflector 6 into the eye of the patient, and on its return pass through the sight openings 21 and 13 to the eye of the operator. The main lens carrier 8 is rotated to any desired position, so that a lens of proper strength, for any particular case, may be brought into operative position at the sight opening just mentioned.

In case the range of lens values in the main lens carrier 8 is insufficient to meet the requirements, one of the higher power lenses in the auxiliary lens carrier 10 is rotated into alignment with sight openings 21 and 13. Furthermore, if an examination is to be made using a character of light different from that resulting from the use of the ordinary electric lamp, then the auxiliary lens carrier 10 is rotated to such position that either the red-free color filter 24 or the day light color filter 25 is brought into operative alignment. Other suitable color filters may be substituted for those mentioned.

When an examination of the ear, nose or other body orifice is to be made, the speculum 31 is brought into operative alignment, so that the observer may look through the sight openings 13 and 21 and on down through the speculum to the body under observation.

It will be apparent from the foregoing disclosure that, in accordance with my present invention, I accomplish all of the objects set forth in the statement of the invention.

It will now be apparent that I have devised a new and useful diagnostic instrument which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

In a device of the character described, a light passage way, a reflector aligned with the light passage way, a divided speculum aligned with the reflector, means for moving the parts of the speculum out of alignment with the reflector, yielding means allowing separation of the parts of the speculum but tending normally to hold them together, and a cam adapted to separate the parts of the speculum as it is moved out of alignment of the reflector.

HENRY L. DE ZENG.